(12) United States Patent
Kim

(10) Patent No.: US 7,676,721 B2
(45) Date of Patent: Mar. 9, 2010

(54) AUTO RE-TRANSMISSION REQUEST METHOD IN A WIRELESS COMMUNICATION SYSTEM

(75) Inventor: Chang-Yeon Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 1051 days.

(21) Appl. No.: 11/293,641

(22) Filed: Dec. 2, 2005

(65) Prior Publication Data

US 2006/0156165 A1    Jul. 13, 2006

(30) Foreign Application Priority Data

Dec. 2, 2004    (KR) .................. 10-2004-100482

(51) Int. Cl.
  *G06F 11/00*    (2006.01)
(52) U.S. Cl. .................. 714/747; 714/749; 714/776
(58) Field of Classification Search ............. 714/747, 714/748, 749, 750, 752, 746, 774, 775, 776
  See application file for complete search history.

(56) References Cited

U.S. PATENT DOCUMENTS

| 5,426,643 A | * | 6/1995 | Smolinske et al. | 370/506 |
| 7,120,852 B2 | * | 10/2006 | Terry et al. | 714/776 |
| 7,213,189 B2 | * | 5/2007 | Malm | 714/748 |
| 7,296,204 B2 | * | 11/2007 | Merritt | 714/748 |
| 7,352,702 B2 | * | 4/2008 | Rosier | 370/236 |

FOREIGN PATENT DOCUMENTS

KR    1020030008324    1/2003

* cited by examiner

*Primary Examiner*—Scott T Baderman
*Assistant Examiner*—Fritz Alphonse
(74) *Attorney, Agent, or Firm*—The Farrell Law Firm, LLP

(57) ABSTRACT

An ARQ system and method for a BWA communication system are provided. A transmitter activates an ARQ timer if exist transmission data or retransmission data and transmits the transmission data or the retransmission data to a receiver. The transmitter then receives a response signal for the transmitted data or the retransmitted data and stops the ARQ timer in the not exist of transmission data.

13 Claims, 4 Drawing Sheets

AUTO RE-TRANSMISSION REQUEST METHOD IN A WIRELESS COMMUNICATION SYSTEM

PRIORITY

This application claims priority under 35 U.S.C. § 119 to an application filed in the Korean Intellectual Property Office on Dec. 2, 2004 and assigned Serial No. 2004 -100482, the contents of which are incorporated herein by reference.

BACKGROUND OF THE INVENTION

1. Field of the Invention

The present invention relates generally to an Automatic Re-transmission Request (ARQ) method in a wireless communication system, and in particular, to an ARQ method in a Broadband Wireless Access (BWA) system.

2. Description of the Related Art

Wireless communication systems have been developed to accommodate more users by multiple access schemes. A major multiple access scheme is Code Division Multiple Access (CDMA). CDMA, originally proposed for voice communication, has now evolved to additionally process high-speed data. The driving force behind the development of the CDMA technology is user demands for high-speed data transmission and rapid technology development. At present, most of $3^{rd}$ generation (3G) mobile communication standards have been approved and commercially deployed.

However, CDMA faces limits in high-speed data transmission due to limited resources. Nonetheless, a user demand for higher data rate is increasing.

In this context, extensive research is being conducted and attempts have been made with the aim to transmit data at higher rates in the wireless communication field.

Among these attempts, BWA is an actively studied area. Particularly, Orthogonal Frequency Division Multiplexing (OFDM) and Orthogonal Frequency Division Multiple Access (OFDMA) were introduced for BWA incorporation. While OFDM is a technology considered for the future-generation broadcasting service in Europe, it is being applied to cellular systems, for the purpose of transmitting a large amount of data at high rates to more users. OFDMA is a transmission scheme in which a plurality of channels are established using orthogonal frequencies and one or more channels are allocated to each user. OFDMA was standardized as the Institute for Electrical and Electronic Engineers (IEEE) 802.16d and the IEEE 802.16e standards.

Typically, communication systems must guarantee the safety of data transmission. The Safety is a more significant factor to wireless communications than to wired communications. The safety refers to the transmission of data with integrity, that is, without loss. Many methods are used to prevent data loss in the communication systems. A main approach is ARQ. In ARQ, when a receiver fails to receive or decode data transmitted from a transmitter, the receiver notifies the transmitter of the reception failure so that the transmitter can retransmit the data.

A description will be made of an ARQ scheme in an OFDMA system compliant with the IEEE 802.16d and the IEEE 802.16e standards.

According to the IEEE 802.16 standards, the transmitter segments a Medium Access Control (MAC) Service Data Unit (SDU) into ARQ blocks, for transmission. The receiver notifies the transmitter if the individual ARQ blocks have been received successfully. Both the transmitter and the receiver must identify the transmitted blocks to determine which block is received and for which block an ARQ is to be created. For block identification, each block is labeled with a Block Sequence Number (BSN).

When BSN information is matched between the transmitter and the receiver within a predetermined period of time, an ARQ window is moved. However, a BSN mismatch may occur between the transmitter and the receiver. In this case, a typical wireless communication system determines that an error has occurred to an ARQ transmission and initializes the ARQ transmission. This is called an ARQ Reset.

The IEEE 802.16 standards specify that an ARQ Reset takes place by transmitting/receiving an ARQ Reset message between the transmitter and the receiver if time intervals ARQ_TX_WINDOW_START and ARQ_RX_WINDOW_START do not increase when ARQ_SYNC_LOSS_TIMEOUT has elapsed.

For the ARQ Reset, activation and initialization of an ARQ_SYNC_LOSS_TIMEOUT timer is to be specified.

Yet, how the ARQ_SYNC_LOSS_TIMEOUT timer is initialized is not clearly set forth the standard. In relation to the time to activate the ARQ_SYNC_LOSS_TIMEOUT timer, the standards define ARQ_SYNC_LOSS_TIMEOUT as "the maximum time interval ARQ_TX_WINDOW_START or ARQ_RX_WINDOW_START shall be allowed to remain at the same value before declaring a loss of synchronization of the sender and receiver state machines when data transfer is known to be active. The ARQ receiver and transmitter state machines manage independent timers. Each has its own criteria for determining when data transfer is 'active'".

The above description, which defines ARQ_SYNC_LOSS_TIMEOUT simply as the time interval for which ARQ_TX_WINDOW_START or ARQ_RX_WINDOW_START can be kept unchanged when data transfer is known to be active, does not provide an explicit specification of ARQ_SYNC_LOSS_TIMEOUT.

In addition, since the cause of the ARQ Reset is confined to the ARQ_SYNC_LOSS_TIMEOUT timer, abnormalities that may be created during an ARQ process are not adequately provided for. Hence, a need exists for restricting an unnecessary ARQ Reset by clarifying the ARQ_SYNC_LOSS_TIMEOUT operation, and defining additional causes for the ARQ Reset, for an efficient ARQ Reset.

FIG. 1 is a diagram illustrating a signal flow referred to for describing expiration of the time interval ARQ_SYNC_LOSS_TIMEOUT according to the IEEE 802.16 standard.

Before describing FIG. 1, it is made clear that transmission and reception take place in the MAC layer 100 of a transmitter and the MAC layer 110 of a receiver and thus the MAC layers 100 and 110 are referred to as a transmitter 100 and a receiver 110, respectively.

Referring to FIG. 1, upon receipt of a MAC SDU from an upper layer in step 120, the transmitter 100 activates an ARQ_SYNC_LOSS_TMEOUT timer in step 122. This timer is used to detect an ARQ sync loss timeout. In step 124, the transmitter 100 transmits a MAC PDU created from the MAC SDU to the receiver 110. The receiver 110 then receives the MAC PDU and activates an ARQ_SYNC_LOSS_TMEOUT timer in step 126. The receiver 110 decodes the MAC PDU and notifies the transmitter 100 of the decoding result. In the case illustrated in FIG. 1, it will be assumed that the decoding failed.

The receiver 110 transmits a Negative-ACKnowledgement (NACK) signal requesting a retransmission to the transmitter 100 in step 128. The transmitter 100 retransmits the MAC PDU to the receiver 110 in step 130. The MAC PDU can be data with the same bits as those of the initially transmitted data or redundancy data with which to help decoding the initially transmitted data.

The receiver 110 decodes the retransmitted MAC PDU in step 132 and notifies the transmitter 100 of the decoding result in step 134. There it will be assumed that the retransmitted MAC PDU is successfully received and decoded. The receiver 110 transmits an ACKnowledgement (ACK) signal to the transmitter 100 in step 134.

In step 136, the receiver 110 transmits the MAC PDU to an upper layer. This is a normal traffic transmission procedure between the transmitter 100 and the receiver 110.

However, an ARQ sync loss timeout may occur even in the absence of any traffic data to transmit from the transmitter in the normal traffic transmission procedure.

With regard to this problem, the conventional technology according to the standards does not provide for a method to temporarily stop the ARQ_SYNC_LOSS_TIMEOUT timer. As in steps 140a and 140b of FIG. 1, even in the absence of any traffic to be transmitted from the transmitter 100, the ARQ_SYNC_LOSS_TIMEOUT timer expires. As a result, an ARQ Reset is carried out in step 142.

With the ARQ Reset, the transmitter 100 and the receiver 110 reactivate their ARQ_SYNC_LOSS_TIMEOUT timers in steps 144a and 144b. If no traffic still exists, the ARQ sync loss timeout lasts till steps 146a and 146b. Thus, the transmitter 100 and the receiver 110 carry out the ARQ Reset again in step 150. They also reactivate the ARQ_SYNC_LOSS_TIMEOUT timers in step 150a and 150b.

The repetition of the ARQ Reset and ARQ_SYNC_LOSS_TIMEOUT timer activation causes the following problem.

Even though ARQ_TX_WINDOW_START and ARQ_TX_WINDOW_START are not updated due to the absence of transmission traffic, the ARQ Reset is unnecessarily repeated. In other words, step 150 of FIG. 1 is performed.

In a real implementation, ARQ_SYNC_LOSS_TIMEOUT is set to 655350 μsec. If there is no traffic to be transmitted within the 655350 μsec, an ARQ Reset message is transmitted and received and an initialization is performed, despite synchronization between the transmitter and the receiver. The unnecessary ARQ Reset leads to channel resource consumption. If a terminal uses a portable power supply like a battery, the standby time or call time of the terminal is reduced.

Now a description will be made of the cause of the above-described additional ARQ Reset. First, an overview of the operations of the ARQ transmitter and receiver will be provided.

The receiver transmits the BSN of a received ARQ block to tell which ARQ block has been received and an ACK/NACK signal for the ARQ block to the transmitter. The transmitter determines if the BSN falls within an ARQ window size or range. If the BSN falls within the ARQ window size and thus it is valid, the transmitter processes the ACK/NACK signal.

Although the transmitter is required to retransmit an ARQ block if the receiver wants, if the BSN is beyond the ARQ window range, the transmitter neglects the ACK/NACK signal. This will be described in great detail with reference to FIG. 2.

FIG. 2 is a diagram illustrating a signal flow for an ARQ Reset when a traffic transmission error occurs between the transmitter and the receiver according to the IEEE 802.16 standards.

Referring to FIG. 2, upon receipt of a MAC SDU from the upper layer in step 200, the transmitter 100 activates the ARQ_SYNC_LOSS_TIMEOUT timer in step 202. As stated before, this timer is used to detect an ARQ sync loss timeout.

In step 222, the transmitter 100 generates a MAC PDU with BSNs of 0 to 4 and transmits it to the receiver 110.

In step 224, the receiver 110 receives the traffic with the incorrect BSNs due to errors, and transmits an ACK with the incorrect BSNs to the transmitter 100 in the illustrated case of FIG. 2. For example, although the transmitter 100 transmits a MAC PDU with the BSNs of 0 to 4, the receiver 110 determines the BSNs to be 8 to 12 due to the errors and transmits an ACK signal for the traffic with the incorrect BSNs of 8 to 12 to the transmitter 100.

Because of the incorrect BSNs, the transmitter 100 neglects the ACK signal in step 226. In step 228, as an RX_PURGE_TIMEOUT timer expires, the receiver 110 considers that reception of the MAC PDU with the BSNs of 8 to 12 is completed and provides the data with the incorrect BSNs to the upper layer.

In the above conventional technology, the receiver 110 transmits to the transmitter 100 an ACK signal with incorrect BSNs due to errors. Later, the receiver 110 fails to receive necessary ARQ blocks and discards them as the RX_PURGE_TIMEOUT timer expires. Nevertheless, the transmitter 100 does not recognize that the errors have occurred and transmits a MAC PDU with BSNs following those of the MAC PDU transmitted in step 222, when an ARQ_RETRY_TIMEOUT timer expires.

As described above, in the case where the receiver 110 transmits to the transmitter 100 an ACK for an ARQ block with a BSN falling within an ARQ window but not transmitted by the transmitter 100, the transmitter 100 has no action to take to deal with this situation.

SUMMARY OF THE INVENTION

Therefore, a need exists for a method of performing an ARQ Reset even when a receiver transmits an ACK signal for a packet which is within an ARQ window size but not actually transmitted by a transmitter, to thereby prevent data transmission errors between the transmitter and the receiver.

An object of the present invention is to substantially solve at least the above problems and/or disadvantages and to provide at least the advantages below. Accordingly, the present invention provides a method of eliminating an unnecessary process in supporting an ARQ in a wireless communication system.

The present invention also provides a method of acquiring accurate synchronization between a transmitter and a receiver in supporting an ARQ in a BWA communication system.

The above objects are achieved by providing an ARQ system and method for a wireless communication system.

According to one aspect of the present invention, in an ARQ method for a transmitter in a broadband wireless access communication system, an ARQ timer is activated if exist transmission data or retransmission data. The transmission data or the retransmission data is transmitted to a receiver. A response signal is received for the transmitted data or the retransmitted data and stopping the ARQ timer in the not exist of transmission data.

According to another aspect of the present invention, in an ARQ method for a receiver in a broadband wireless access communication system, an ARQ timer is activated upon receipt of data from a transmitter. The received data is decoded and a decoding result is transmitted to the transmitter. If the decoding result is an ACK and no data is received from the transmitter for a predetermined period of time, the ARQ timer is stopped.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Figure 1:
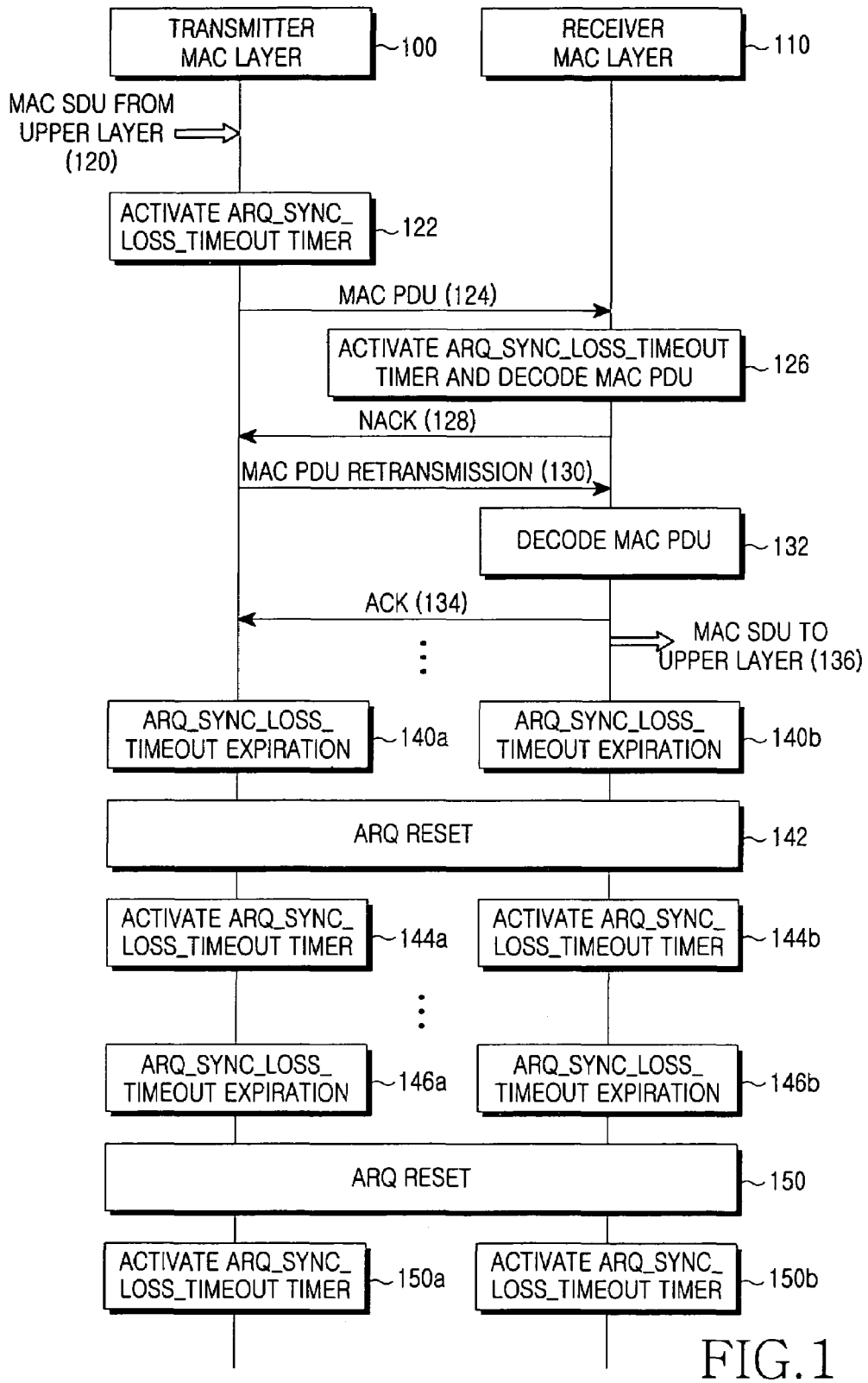
FIG. 1 is a diagram illustrating a signal flow referred to for describing expiration of a time interval ARQ_SYNC_LOSS_TMEOUT according to the IEEE 802.16 standard.
Figure 2:
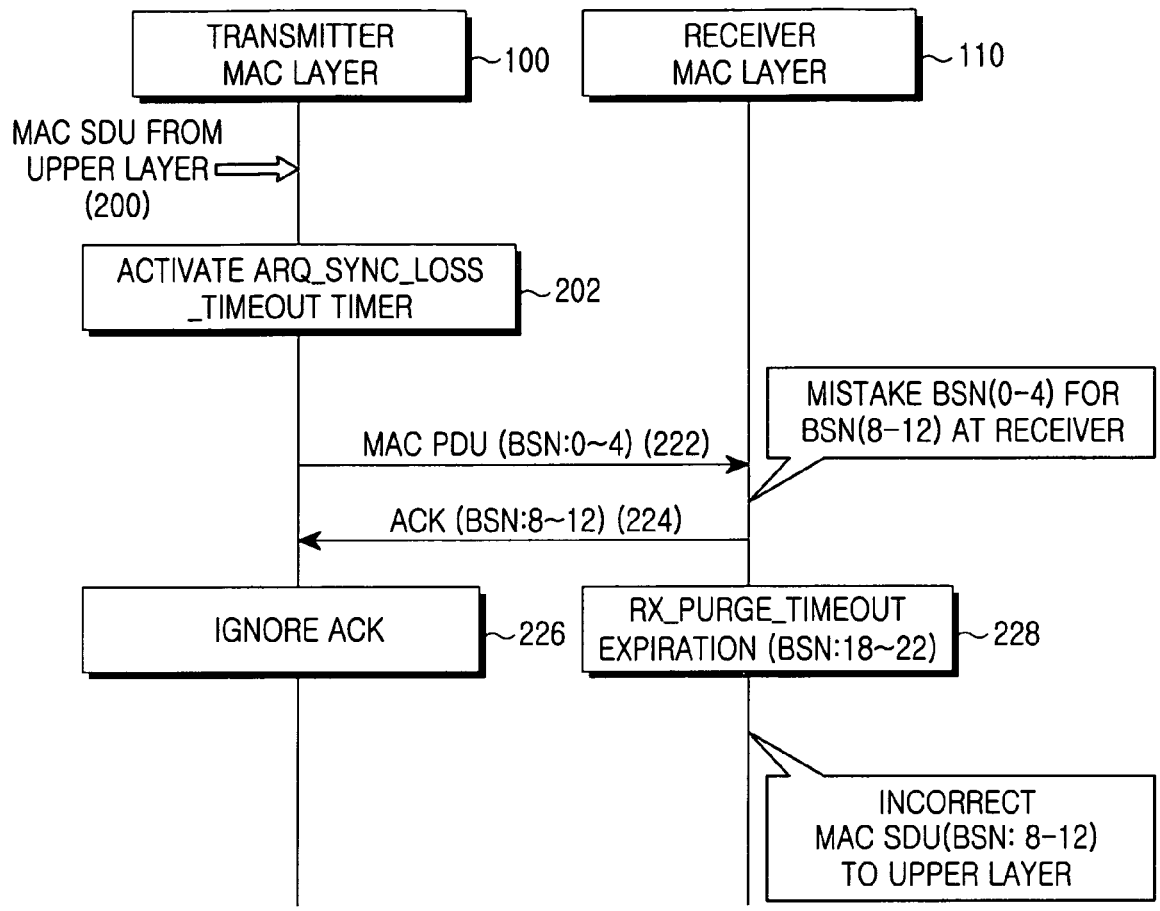
FIG. 2 is a diagram illustrating a signal flow for an ARQ Reset when a traffic transmission error occurs between the transmitter and the receiver according to the IEEE 802.16 standard.

Preferred embodiments of the present invention will be described herein below with reference to the accompanying drawings. In the following description, well-known functions or constructions are not described in detail since they would obscure the invention in unnecessary detail.

Before describing the present invention, activation, reactivation and stopping of an ARQ_SYNC_LOSS_TIMEOUT timer in a transmitter and a receiver will be described separately.

The ARQ_SYNC_LOSS_TIMEOUT timer is activated or reactivated in the transmitter in the following cases.

In the presence of a transmitted ARQ block not completely processed, i.e. an ARQ block in an outstanding state, the transmitter activates or reactivates the ARQ_SYNC_LOSS_TIMEOUT timer. Also, when an ARQ_RETRY_TIMEOUT timer expires or as the transmitter receives NACK signals from receiver and thus a waiting-for-retransmission state ARQ block exist, the transmitter activates or reactivates the ARQ_SYNC_LOSS_TIMEOUT timer. In these two cases, ARQ_TX_NEXT_BSN is larger than ARQ_TX_WINDOW_ START.

The ARQ_SYNC_LOSS_TIMEOUT timer is stopped in the transmitter in the following cases.

As the transmitter receives ACK signals for all ARQ blocks from the receiver and thus outstanding state or waiting-for-retransmission state ARQ blocks not exist, the transmitter stops the ARQ_SYNC_LOSS_TIMEOUT timer. In the absence of transmission traffic after an ARQ Reset, the transmitter also stops the ARQ_SYNC_LOSS_TIMEOUT timer. In both cases, ARQ_TX_NEXT_BSN is equal to ARQ_TX_WINDOW_START.

The receiver activates or reactivates its ARQ_SYNC_LOSS_TIMEOUT timer in the following cases.

If there is a lost ARQ block among received ARQ blocks and a NACK signal is to be transmitted for the lost ARQ block, the receiver activates or reactivates the ARQ_SYNC_LOSS_TIMEOUT timer. In this case, ARQ_RX_HIGHEST_BSN is larger than ARQ_RX_WINDOW_START.

The receiver stops the ARQ_SYNC_LOSS_TIMEOUT timer when it receives a retransmitted lost ARQ block from the transmitter and recovers the ARQ block, or when it receives an ARQ Discard message from the transmitter and thus does not need to transmit a NACK signal for the ARQ block. In this case, ARQ_RX_HIGHEST_BSN is equal to ARQ_RX_WINDOW_START.

As described above, the operation of the ARQ_SYNC_LOSS_TIMEOUT timer is discontinued when there is no need for traffic transmission in order to prevent an unnecessary ARQ Reset.

Upon receipt of an ACK signal from the receiver for an ARQ block that the transmitter did not transmit, the transmitter operates in the following way.

The transmitter first receives an ACK/NACK signal from the receiver and determines if the BSN of the ACK/NACK signal falls within an ARQ window range and thus is valid. If the BSN is not valid, the transmitter ignores the ACK/NACK signal. On the contrary, if the BSN is valid, the transmitter processes the ACK/NACK signal in one of the following two methods.

If the ARQ block with the valid BSN is outstanding, retransmission, or discarded, the transmitter determines that the receiver has received the ARQ block.

If the ARQ block with the valid BSN is in a not-sent state, the transmitter discontinues traffic transmission to the receiver and starts an ARQ Reset.

Figure 3:
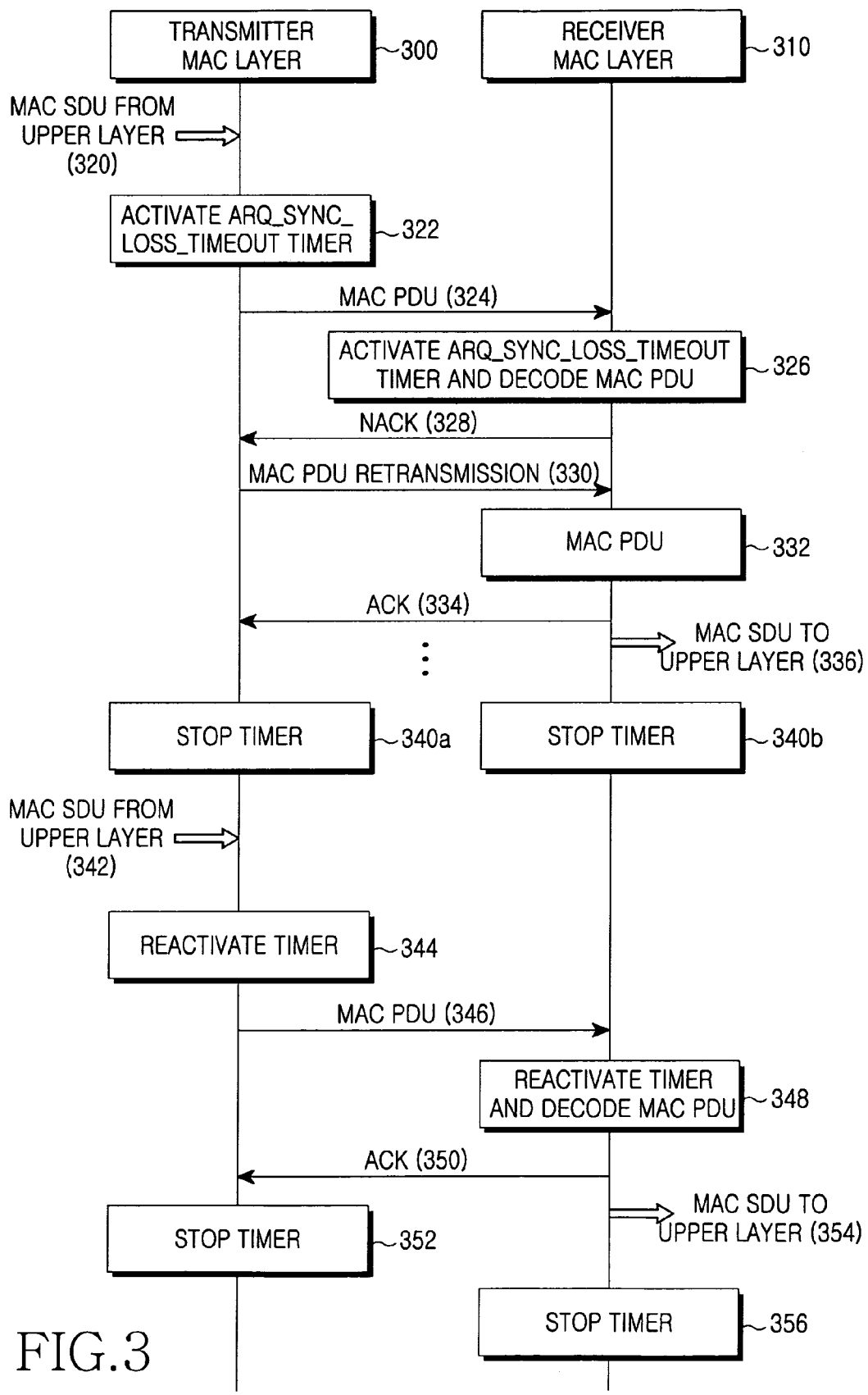
FIG. 3 is a diagram illustrating a signal flow in the case where the time interval ARQ_SYNC_LOSS_TIMEOUT expires in a transmitter and a receiver in a BWA communication system according to an embodiment of the present invention.

FIG. 3 is a diagram illustrating a signal flow in the case where a time of period termed ARQ_SYNC_LOSS_TIMEOUT expires in a transmitter and a receiver in a BWA communication system according to an embodiment of the present invention.

Before describing FIG. 3, it is to be appreciated that the procedure described in FIG. 3 takes place in a MAC layer 300 of the transmitter and a MAC layer 310 of the receiver and for conciseness, the MAC layers 300 and 310 are referred to as the transmitter and the receiver, respectively.

Referring to FIG. 3, upon receipt of a MAC SDU from an upper layer in step 320, the transmitter 300 activates an ARQ_SYNC_LOSS_TIMEOUT timer in step 322. This timer is used to detect expiration of the ARQ_SYNC_LOSS_TIMEOUT period. In step 324, the transmitter 300 transmits a MAC PDU created from the MAC SDU to the receiver 310. The receiver 310 activates an ARQ_SYNC_LOSS_TIMEOUT timer for the received MAC PDU and decodes the MAC PDU in step 326. In step 328, the receiver 310 transmits an ACK/NACK signal for the received MAC PDU to the transmitter 300. In the illustrated case of FIG. 3, the decoding is failed and thus the receiver 310 transmits an NACK signal to the transmitter 300 in step 328.

Upon receipt of the NACK signal, the transmitter 300 retransmits the MAC PDU to the receiver 300 in step 324. The retransmission MAC PDU may have the same bits as those of the transmitted MAC PDU, or redundancy information with which to assist decoding of the transmitted MAC PDU.

In step 332, the receiver 310 decodes the retransmitted MAC PDU. It is assumed herein that the decoding of the retransmitted MAC PDU is successful. Thus, the receiver 310 transmits an ACK signal to the transmitter in step 334 and provides the MACK PDU to an upper layer in step 336.

So far, traffic transmission/reception has been normally carried out between the transmitter 300 and the receiver 310. In the conventional technology, however, in the absence of transmission traffic, the ARQ_SYNC_LOSS_TIMEOUT timer expires, accompanied by an unnecessary ARQ Reset.

By contrast, in the present invention, if there is no more information to be transmitted after the transmitter 300 receives an ACK signal, the transmitter 300 stops the ARQ_SYNC_LOSS_TIMEOUT timer in step 304a. The receiver 310 also stops its ARQ_SYNC_LOSS_TIMEOUT timer in step 340*b*. That is, both the transmitter 300 and the receiver 310 are configured to stop the ARQ_SYNC_LOSS_TIMEOUT timers in the absence of traffic to transmit from the transmitter 300.

As described above, if no traffic transmission/reception is carried out between the transmitter 300 and the receiver 310, an unnecessary timer operation is eliminated. Therefore, an ARQ Reset is not unnecessarily performed, which might otherwise occur due to unnecessary timer activation despite synchronization between the transmitter 300 and the receiver 310.

Upon receipt of a MAC SDU from the upper layer in step 342 after the timer is stopped, the transmitter 300 reactivates the ARQ_SYNC_LOSS_TIMEOUT timer in step 344. This timer is used to detect expiration of the ARQ_SYNC_LOSS_TIMEOUT period, as stated before. In step 346, the transmitter 300 transmits a MAC PDU created from the MAC SDU to the receiver 310.

The receiver 310 reactivates the ARQ_SYNC_LOSS_TIMEOUT timer for the received MAC PDU and decodes the MAC PDU in step 346. Assuming that the MAC PDU reception and decoding is successful, the receiver 310 transmits an ACK signal to the transmitter 300 in step 350 and provides the MAC SDU to the upper layer in step 354. If there is no more traffic received, the receiver 310 stops the ARQ_SYNC_LOSS_TIMEOUT in step 356.

Meanwhile, in the absence of traffic to be transmitted further after reception of the ACK signal, the transmitter 300 also stops the ARQ_SYNC_LOSS_TIMEOUT timer in step 352.

Now a description will be made of signal processing when the transmitter receives an ACK/NACK signal from the receiver for an ARQ block with a BSN not transmitted from the transmitter.

Figure 4:
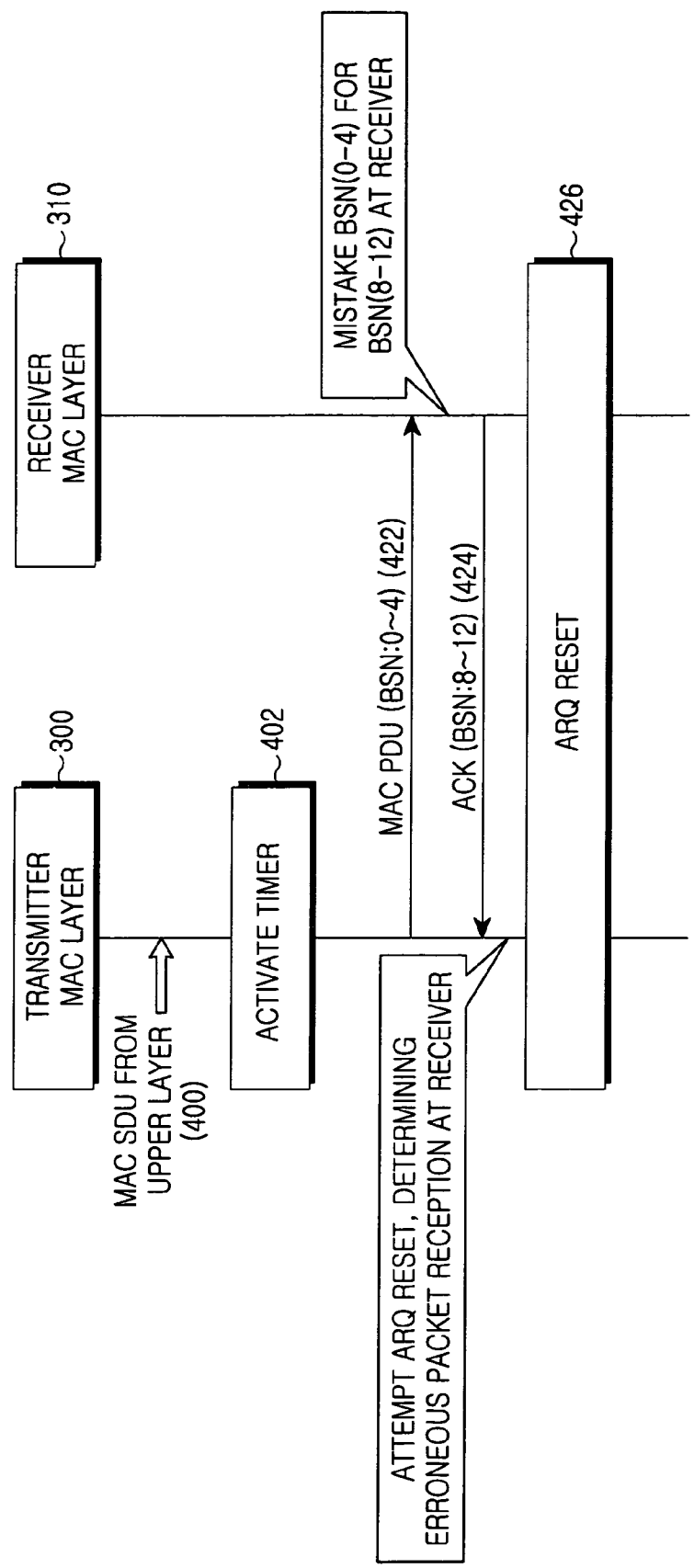
FIG. 4 is a diagram illustrating a signal flow when a BSN mismatch occurs between the transmitter and the receiver in the BWA communication system according to an embodiment of the present invention.

FIG. 4 is a diagram illustrating a signal flow when a data error has been generated between the transmitter and the receiver in the BWA communication system according to an embodiment of the present invention. Particularly, this procedure relates to signal processing in the case of a BSN mismatch between the transmitter and the receiver.

Referring to FIG. 4, upon receipt of a MAC SDU from the upper layer in step 400, the transmitter 300 activates the ARQ_SYNC_LOSS_TIMEOUT timer in step 402. This timer is used to detect expiration of the ARQ_SYNC_LOSS_TIMEOUT period. In step 422, the transmitter 300 generates a MAC PDU with BSNs of 0 to 4 from the MAC SDU and transmits it to the receiver 310.

In the illustrated case, the receiver 310 receives the traffic with incorrect BSNs, for example, BSNs of 8 to 12 and transmits to the transmitter 300 an ACK signal for the traffic along with the incorrect BSNs. That is, although the transmitter 300 transmits the MAC PDU with the BSNs of 0 to 4, the receiver 310 incorrectly considers that the BSNs of the received MAC PDU are 8 to 12. Thus, the receiver 310 transmits in step 424 an ACK signal for the MAC PDU along with the incorrect BSNs of 8 to 12 to the transmitter 300.

Upon receipt from the receiver 310 of an ACK/NACK signal for a not-transmitted ARQ block, the transmitter 300 determines that the receiver 310 has received incorrect traffic due to errors. Thus, the transmitter 300 and the receiver 310 perform an ARQ Reset in step 426. With the ARQ reset, synchronization is acquired between the ARQ_SYNC_LOSS_TIMEOUT timers of the transmitter 300 and the receiver 310.

The transmitter 300 resets the BSNs after the ARQ Reset. For instance, the transmitter 300 creates a MAC PDU with BSNs reset to 0 to 10 and transmits it to the receiver 310. The receiver 310 decodes the received MAC PDU.

As described above, the present invention advantageously solves the problem of unnecessary ARQ Reset encountered with the conventional BWA communication system, thereby enabling efficient and stable data transmission. Furthermore, the power consumption of a terminal is reduced and the utilization of channel resources is increased.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An Automatic Re-transmission Request (ARQ) method for a transmitter in a broadband wireless access communication system, comprising the steps of:

activating an ARQ timer if transmission data or retransmission data exist;

transmitting the transmission data or the retransmission data to a receiver; and receiving a response signal for the transmitted data or the retransmitted data and stopping the ARQ timer if response signals have been received for all data and neither transmission data nor retransmission data exists;

reactivating the ARQ timer upon receipt of transmission data to be transmitted to the receiver from an upper layer while the ARQ timer is stopped; and performing an ARQ reset upon receipt of a response signal for data not transmitted from the transmitter.

2. The ARQ method of claim 1, wherein the transmitted data includes a block sequence number (BSN).

3. The ARQ method of claim 1, further comprising the step of activating the ARQ timer if the transmitted data is in an outstanding state.

4. The ARQ method of claim 1, further comprising the step of activating the ARQ timer in the presence of retransmission data for which a negative acknowledgement (NACK) signal has been received from the receiver.

5. The ARQ method of claim 1, further comprising the step of stopping the ARQ timer in the absence of transmission data for the receiver after the ARQ reset.

6. The ARQ method of claim 1, wherein the ARQ timer includes an ARQ_SYNC_LOSS_TIMEOUT timer.

7. The ARQ method of claim 1, further comprising the steps of:

determining, upon receipt from the transmitter of a response signal for data not transmitted, if the BSN of the response signal falls within an ARQ window range and thus is valid; and determining the transmission state of the data if the BSN is valid, discontinuing data transmission if the data is not valid, and performing an ARQ reset.

8. An Automatic Re-transmission Request (ARQ) method for a receiver in a broadband wireless access communication system, comprising the steps of:

activating an ARQ timer upon receipt of data from a transmitter;

decoding the received data and transmitting a response signal corresponding to the decoding result to the transmitter;

stopping the ARQ timer if all data has been successfully received from the transmitter or if the decoded data is transmitted to an upper layer;

reactivating the ARQ timer upon receipt of data from the transmitter while the ARQ timer is stopped; and performing an ARQ reset if transmission errors have occurred to the received data.

9. The ARQ method of claim 8, wherein the received data includes a block sequence number (BSN).

10. The ARQ method of claim 8, further comprising the step of activating the ARQ timer if the received data has loss and a negative acknowledgement (NACK) signal is to be transmitted for the data to the transmitter.

11. The ARQ method of claim 8, further comprising the step of stopping the ARQ timer if there is no need for transmitting a response signal to the transmitter.

12. The ARQ method of claim 8, further comprising the step of stopping the ARQ timer if an ARQ discard message is received and thus there is no need for transmitting a response signal to the transmitter.

13. The ARQ method of claim 8, wherein the ARQ timer includes an ARQ_SYNC_LOSS_TIMEOUT timer.

\* \* \* \* \*